United States Patent [19]

Marion

[11] Patent Number: 5,020,852
[45] Date of Patent: Jun. 4, 1991

[54] BICYCLE SEAT

[76] Inventor: Laura E. Marion, 61 Cheryl Ann Dr., Coldwater, Mich. 49036

[21] Appl. No.: 529,537

[22] Filed: May 29, 1990

[51] Int. Cl.⁵ .......................... B62J 1/00; A47C 27/08
[52] U.S. Cl. .................................... 297/200; 297/209; 297/214; 297/452; 297/DIG. 3; 5/450; 5/441; 5/475
[58] Field of Search ............... 297/199, 200, 208, 209, 297/214; 5/450, 481, 436, 441, 442, 475, 477; 267/143, 140.4, 34

[56] References Cited

U.S. PATENT DOCUMENTS

| | | | |
|---|---|---|---|
| 540,725 | 6/1895 | Craig | 297/200 |
| 3,083,381 | 4/1963 | Bailey | 5/477 |
| 3,110,520 | 11/1963 | Herding | 5/450 |
| 3,766,579 | 10/1973 | Shields | 5/450 |
| 3,833,952 | 9/1974 | Rosenberg | 5/477 |
| 4,192,031 | 3/1980 | Forgel | 5/481 |
| 4,753,705 | 6/1988 | Poncy | 5/442 |
| 4,827,546 | 5/1989 | Cvetkovic | 5/475 |
| 4,850,643 | 7/1989 | Rollman | 297/214 |

FOREIGN PATENT DOCUMENTS 189378  11/1922  United Kingdom ................ 297/195

*Primary Examiner*—Kenneth J. Dorner
*Assistant Examiner*—Cassandra Hope
*Attorney, Agent, or Firm*—Leon Gilden

[57] ABSTRACT

An apparatus including a saddle arrangement, including a flexible top surface of a generally kidney shaped configuration, with an arcuate side wall depending downwardly therefrom mounted to a rigid floor. Captured therebetween is a relatively thick cushion, with a matrix of spaced springs mounted within a spring chamber underlying the cushion. Modifications of the invention include coil springs defining the matrix of springs, each including a fluid filled shock dampening bag mounted within each spring. A further modification includes a fluid chamber mounted within the cushion, as well as an optionally utilized pneumatic chamber mounted adjacent the fluid cushion to effect relative rigidity and height of the cushion to accommodate variations and comfort requirements by individual riders utilizing the saddle.

5 Claims, 5 Drawing Sheets

BICYCLE SEAT

BACKGROUND OF THE INVENTION

1. Field of the Invention

The field of invention relates to bicycle seats and more particularly pertains to a new and improved bicycle seat, for particular use upon an exercycle and the like to accommodate continuous seating of extended duration during repetitive cycling.

2. Description of the Prior Art

During continuous exercycling, various groups of individuals such as elderly people and individuals of riders possessed of skeletal maladies need to employ a bicycle seat of enhanced comfort and cushion during a repetitive cycling and exercising procedure. Prior art bicycle seats have failed to accommodate a particular problem related to individuals as noted above, wherein examples of such prior art structure may be found in Young U.S. Pat. No. 3,844,611 setting forth a bicycle seat, including a relatively thin padded captured member within a flexible housing.

Bird U.S. Pat. No. 3,856,348 utilizes a seating arrangement with a cushioned covering mounting generally "U" shaped framework, wherein the framework is pivoted at its forward end and resiliently biased at its rear end by coil springs.

Lamkemuyer U.S. Pat. No. 3,905,643 sets forth a bicycle seat utilizing a relatiVely rigid support, with springs at a rear end and pivoted at a forward end in a normal configuration for bicycles, wherein the present invention attempts to overcome such deficiencies by providing a completely cushioned surface to accommodate an individual not requiring an individual to utilize a particular physical attitude in riding in an exercycle arrangement, as taught by the instant invention.

Mesinger U.S. Pat. No. 4,063,775 sets forth a unitary molded seat for accommodating an individual thereon.

Svehla U.S. Pat. No. 3,712,670, et al. sets forth an accessory seat attachment for various cycles utilizing a dish-shaped member formed with a padded layer to accommodate an individual thereon.

As such, it may be appreciated that there continues to be a need for a new and improved bicycle seat as set forth by the instant invention which addresses both the problems of ease of use, as well as effectiveness in construction and in this respect, the present invention substantially fulfills this need.

SUMMARY OF THE INVENTION

In view of the foregoing disadvantages inherent in the known types of bicycle seats now present in the prior art, the present invention provides a bicycle seat wherein the same incorporates a relatively thick padding overlay of a spring chamber mounting a matrix of coil springs therewithin to evenly and conveniently accommodate an individual thereon. As such, the general purpose of the present invention, which will be described subsequently in greater detail, is to provide a new and improved bicycle seat which has all the advantages of the prior art bicycle seats and none of the disadvantages.

To attain this, the present invention provides an apparatus including a saddle arrangement, including a flexible top surface of a generally kidney shaped configuration, with an arcuate side wall depending downwardly therefrom mounted to a rigid floor. Captured therebetween is a relatively thick cushion, with a matrix of spaced springs mounted within a spring chamber underlying the cushion. Modifications of the invention include coil springs defining the matrix of springs, each including a fluid filled shock dampening bag mounted within each spring. A further modification includes a fluid chamber mounted within the cushion, as well as an optionally utilized pneumatic chamber mounted adjacent the fluid cushion to effect relative rigidity and height of the cushion to accommodate variations and comfort requirements by individual riders utilizing the saddle.

My invention besides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle seat which has all the advantages of the prior art bicycle seats and none of the disadvantages.

It is another object of the present invention to provide a new and improved bicycle seat which may be easily and efficiently manufactured and marketed.

It is a further object of the present invention to provide a new and improved bicycle seat which is of a durable and reliable construction.

An even further object of the present invention is to provide a new and improved bicycle seat which is susceptible of a low cost of manufacture with regard to both materials and labor, and which accordingly is then susceptible of low prices of sale to the consuming public, thereby making such bicycle seats economically available to the buying public.

Still yet another object of the present invention is to provide a new and improved bicycle seat which provides in the apparatuses and methods of the prior art some of the advantages thereof, while simultaneously overcoming some of the disadvantages normally associated therewith.

Still another object of the present invention is to provide a new and improved bicycle seat Wherein the same comfortably and conveniently accommodates an individual for mounting upon an exercycle and the like to arrange the bicycle seat not directing an individual into a predisposed physical attitude upon the seat arrangement.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
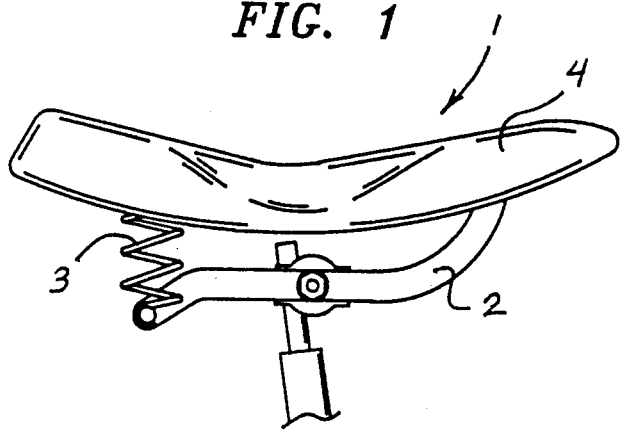
FIG. 1 is an orthographic side view, taken in elevation, of a prior art bicycle seat.
Figure 2:
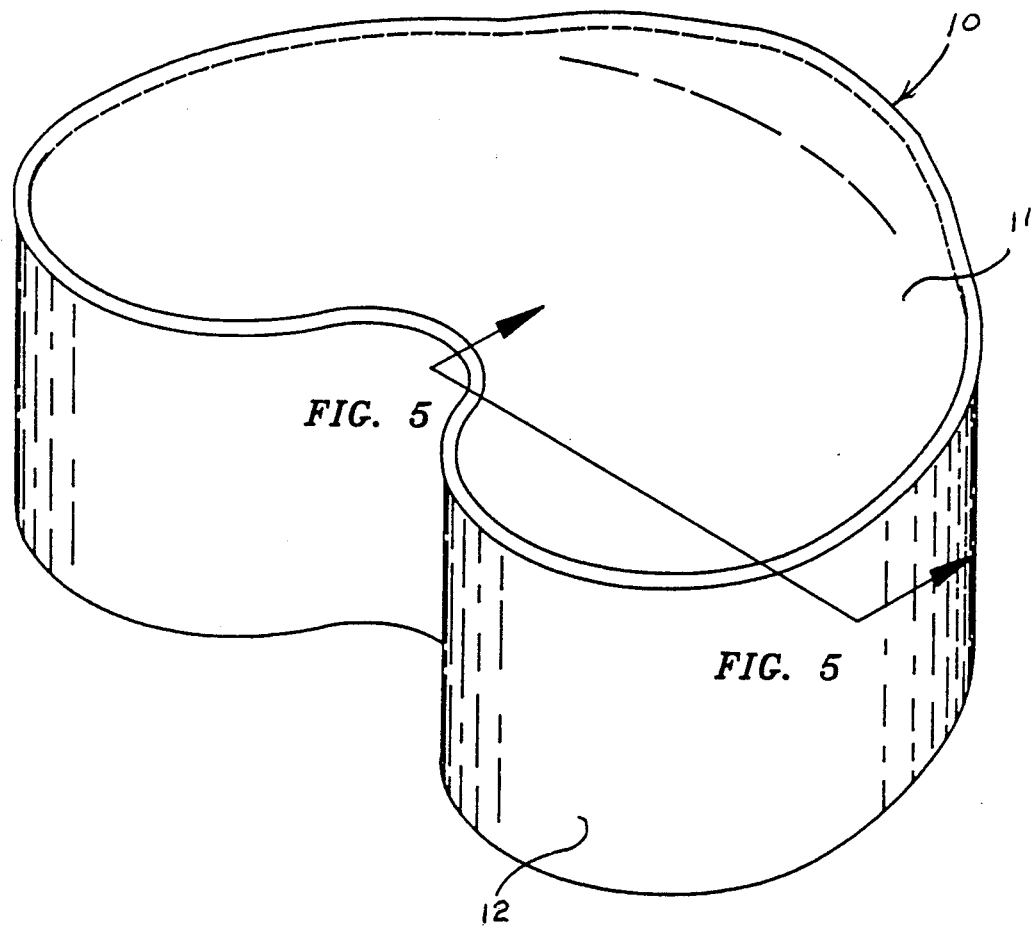
FIG. 2 is an isometric illustration of the instant invention.

With reference now to the drawings, and in particular to FIGS. 1 to 10 thereof, a new and improved bicycle seat embodying the principles and concepts of the present invention and generally designated by the reference numerals 10, 10a, 10b, 10c, 10d, and 10e will be described.

FIG. 1 illustrates a prior art bicycle seat arrangement 1, wherein a rigid framework 2 mounts a plurality of springs 3 rearwardly of the framework 2, wherein the framework 2 is pivotally mounted at its forward end to accommodate a saddle 4 thereon.

Figure 3:
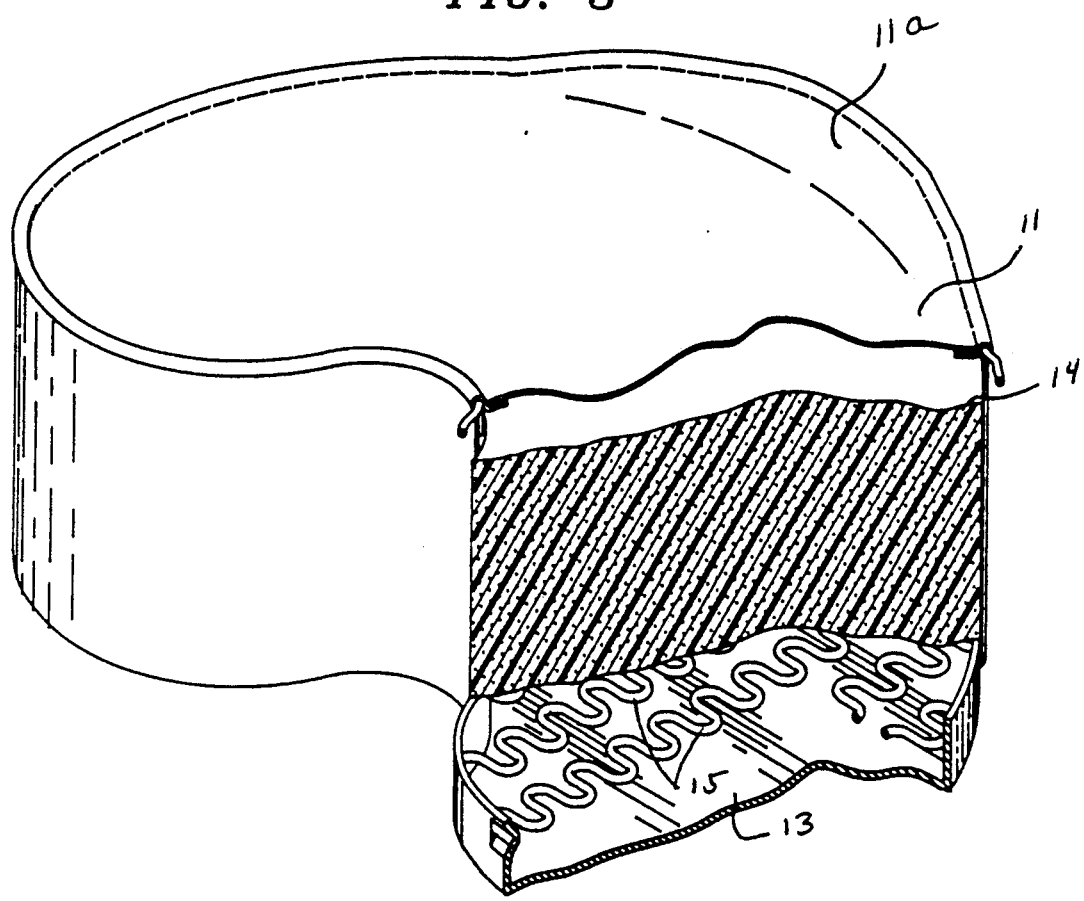
FIG. 3 an orthographic cross-sectional view of the instant invention.
Figure 4:
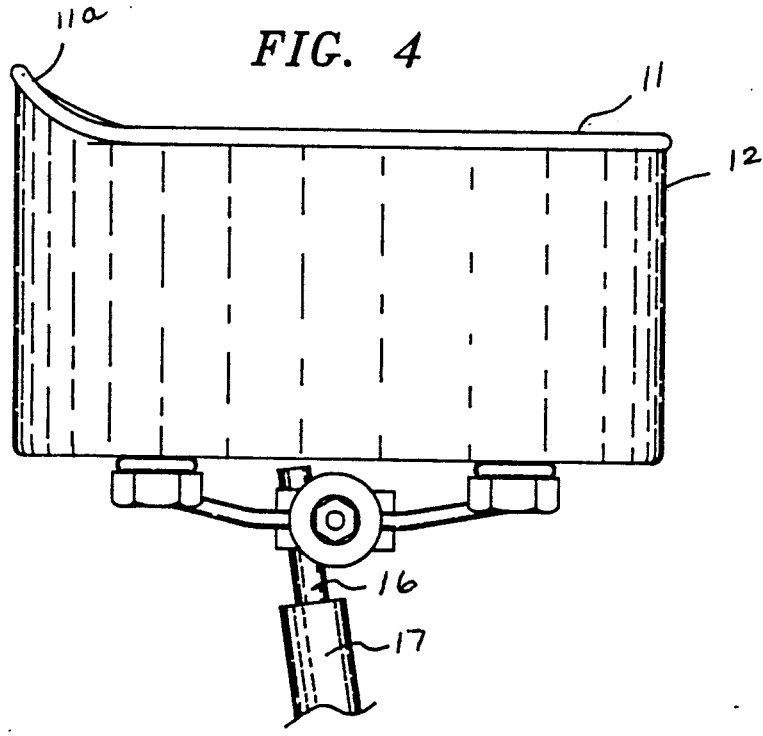
FIG. 4 is an orthographic side view, taken in elevation, of the instant invention.
Figure 5:
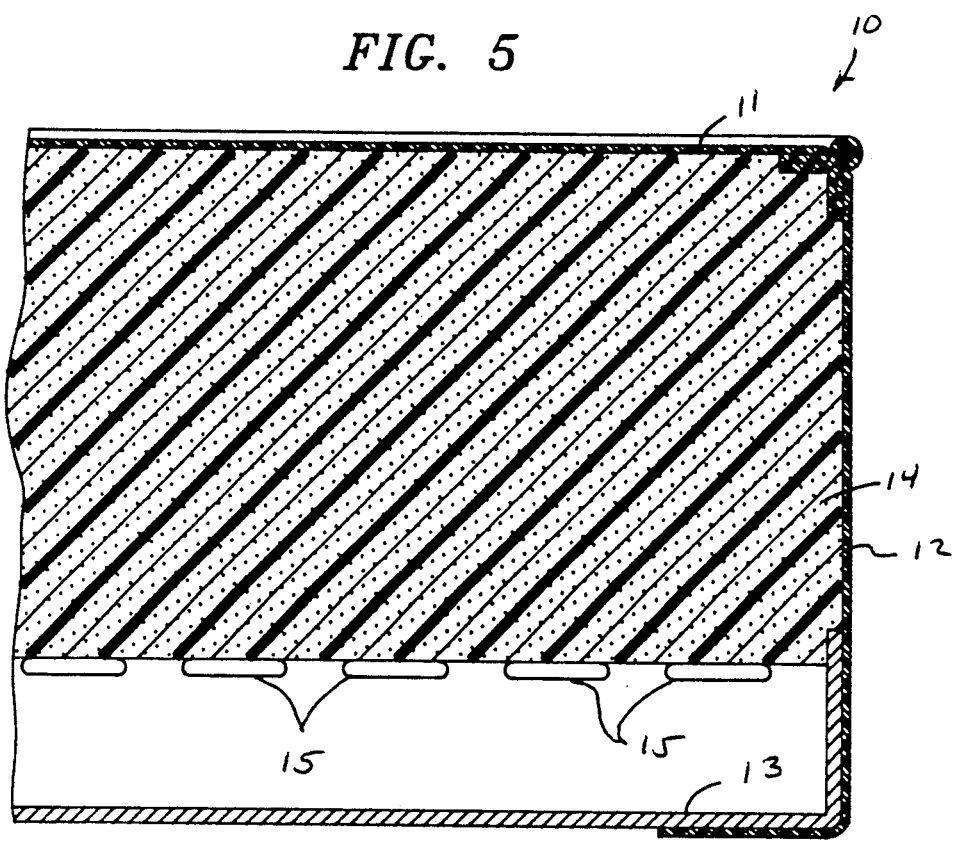
FIG. 5 is an orthographic view, taken along the lines 5—5 of FIG. 2, in the direction indicated by the arrows.

More specifically, the bicycle seat 10 of the instant invention includes a generally kidney shaped seat including a flexible top surface layer 11, and a flexible arcuate side wall 12, wherein the side wall 12 may be further formed if required of an extensible material to accommodate deformation and stretching of the side wall. Reference to FIG. 3 illustrates the use of a relatively rigid support floor 13 formed of a polymeric metallic structure, including a thick cushion insert 14 coextensively directed through the seat, with an underlying matrix of spaced parallel sinusoidal flat springs 15 to underlie and support the insert 14. Further, a rear ridge 11a extends upwardly to provide lumbar support to an individual mounted upon the seat. A support tube 16 underlies a framework to mount the rigid support floor 13 thereon, wherein the support tube 16 is telescopingly receiVed within a further tube 17 to provide vertical adjustment to the seat arrangement.

Figure 6:
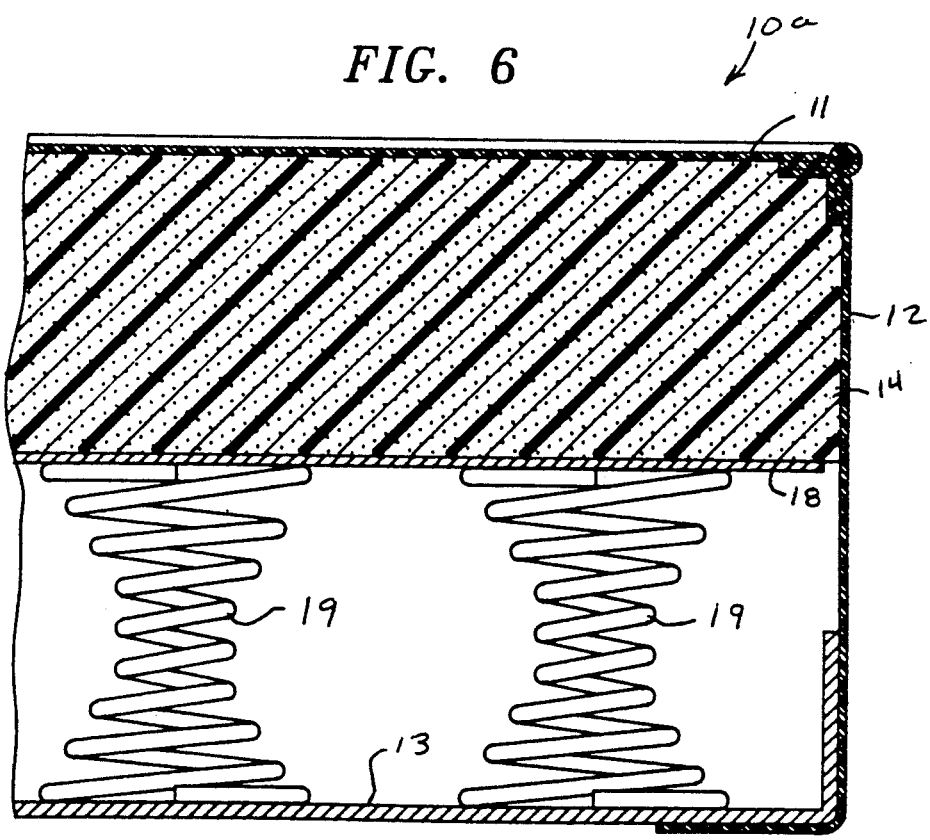
FIG. 6 is a modification of the instant invention utilizing coil springs.
Figure 7:
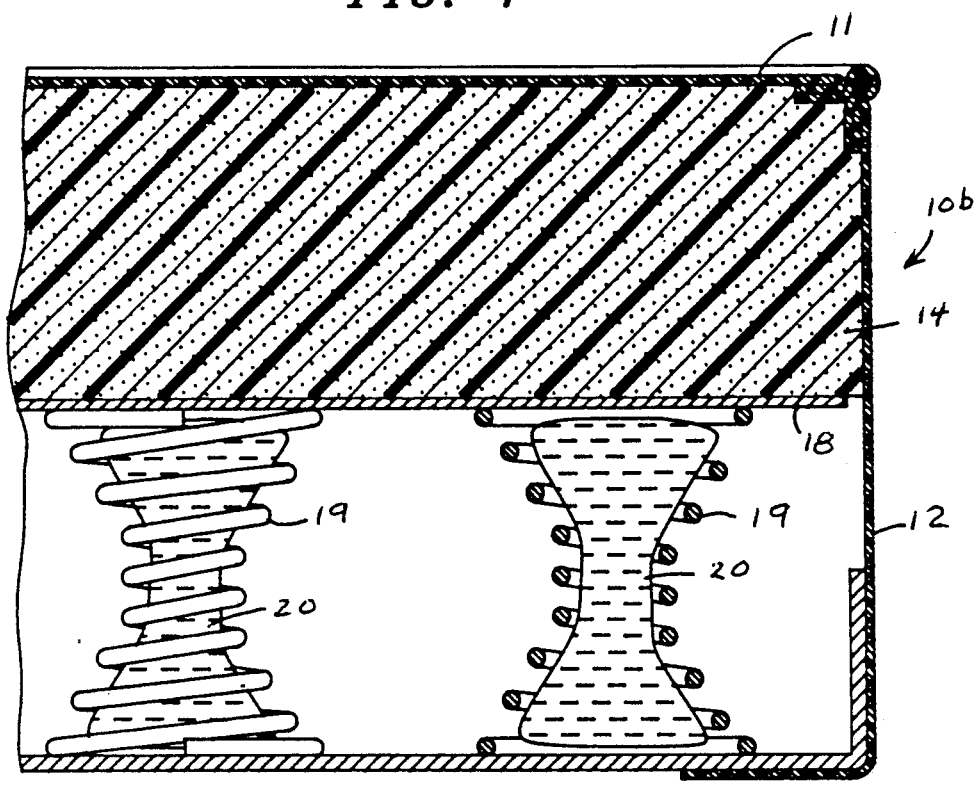
FIG. 7 is a modification of the instant invention utilizing fluid filled dampening chambers within the coil springs.

FIG. 6 illustrates a modified bicycle seat 10a utilizing a matrix of coil springs 19 arranged in a parallel relationship coextensively within a spring chamber underlying the cushion insert 14 and the floor 13. A cushion plate 18 is positioned adjacent the bottom surface of the cushion insert 14 and is captured between the cushion insert 14 and the coil springs 19. The coil springs 19 are of a generally hourglass configuration to enhance support throughout use of the seat and accommodate repositioning of an individual mounted upon the surface layer 11. The modification of the invention as set forth in FIG. 7 includes the springs 19, each including a flexible fluid filled shock dampening bag 20 mounted therewithin. The shock dampening bags each may include a compressible fluid to effect dampening of an individual mounted upon the seat.

Figure 8:
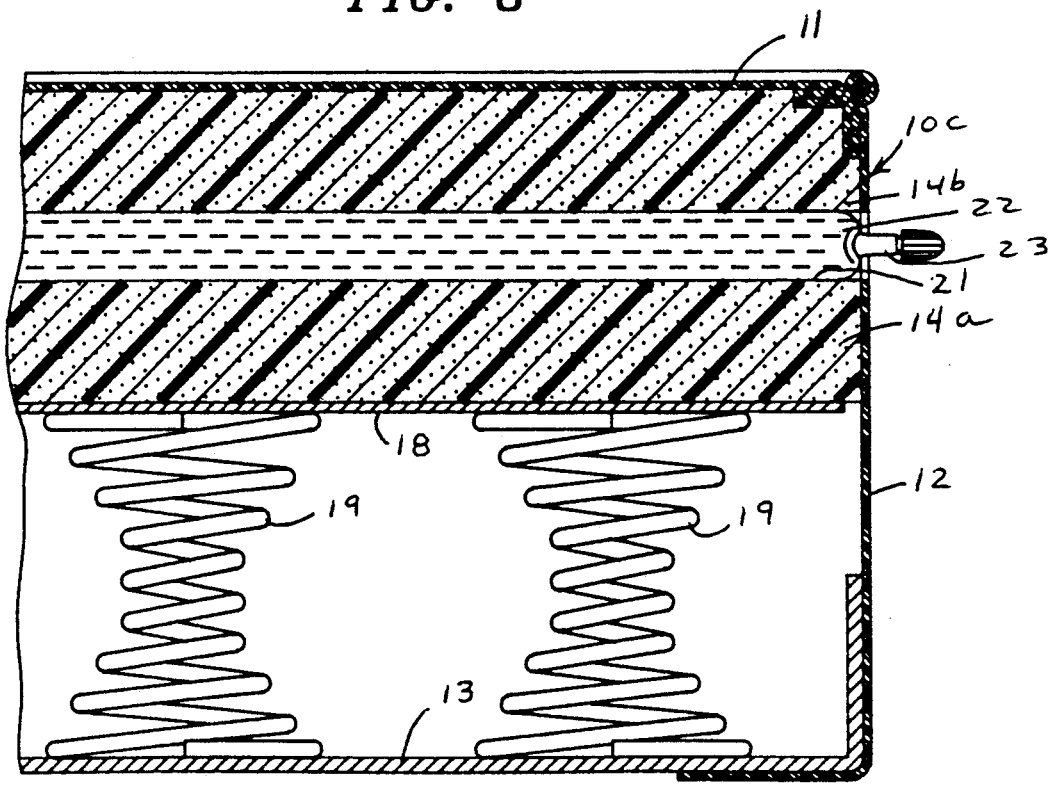
FIG. 8 is a further modification of the instant invention utilizing a fluid chamber mounted within the cushion of the instant invention.
Figure 9:
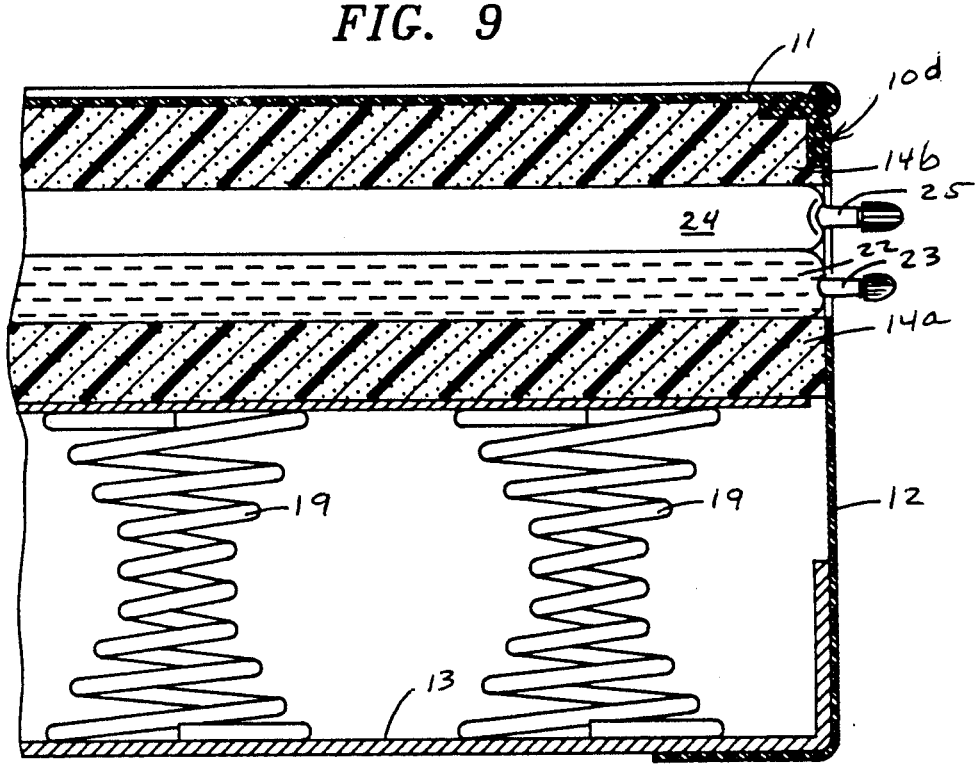
FIG. 9 is an orthographic cross-sectional view of the instant invention illustrating the use of a combination of a pneumatic chamber and fluid chamber within the cushion of the instant invention.
Figure 10:
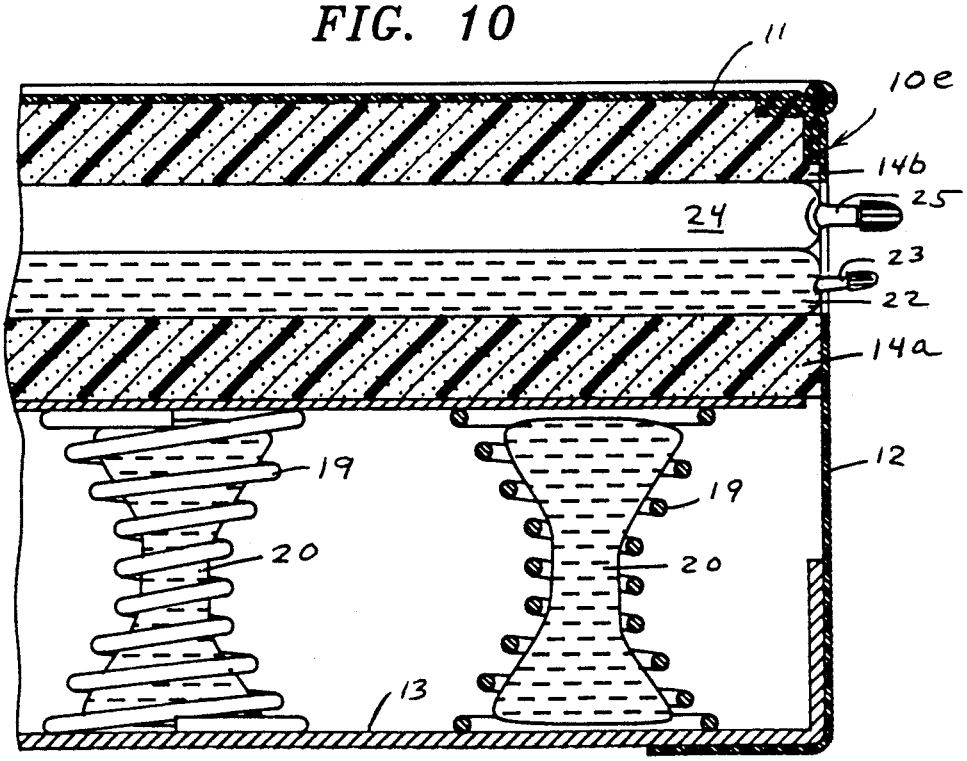
FIG. 10 is an orthographic cross-sectional view of a further modified aspect of the instant invention utilizing a fluid chamber, pneumatic chamber, and dampening chambers within the bicycle seat arrangement of the instant invention.

FIG. 8 sets forth a modification of the invention 10c, wherein a fluid filled flexible container 22 includes a container valve 23 extending through an opening in the side wall 12 to accommodate varying amounts of fluid therewithin to effect firmness of the seat during use. The container positioned within a coextensively formed coextensive cushion cavity 21 defines an upper cushion 14b mounted above the fluid container 22 and a lower cushion 14a mounted below the fluid container. The invention as set forth in FIG. 9 includes additionally a pneumatic chamber 24, including an individual pneumatic chamber valve 25 to effect vertical height positioning of the seat and thereby vary a cushioning effect of the seat by an individual wherein additionally the flexible fluid filled shock dampening bags 20 are optionally utilized in the combination as illustrated in FIG. 10.

Typically, the seat is constructed, wherein the cushion insert is formed of a width substantially three to four inches in thickness, and wherein the top surface layer is defined by a width substantially ten to twelve inches in width, and of a length seven to nine inches defined between the ridge and the recess defined by the spaced projections of the kidney shaped top surface layer 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by U.S. Patent is as follows:

1. A bicycle seat comprising, in combination,
a rigid support floor, and
a flexible extensible arcuate side wall, and
a flexible top surface layer of a generally kidney shaped configuration, and
the top layer extending rearwardly into a rear ridge extending upwardly from the top surface layer, and
the seat further including a thick cushion insert mounted in a spaced relationship above the rigid support floor defining a spring chamber therebetween, wherein a plurality of springs are mounted between the rigid support floor and the cushion insert, and
wherein the springs include spaced parallel springs mounted within the spring chamber, and
wherein each of the springs include coiled springs, each coil spring of a generally hourglass configuration and arranged orthogonally between the cushion insert and the support floor, and
wherein each coil spring includes a flexible fluid filled shock dampening bag mounted therewithin coextensively within each coil spring, and wherein each bag is filled with a compressible fluid to effect dampening of each coil spring in use.

2. A bicycle seat as set forth in claim 1 including a cushion plate mounted between the coil springs and a bottom surface of the cushion insert.

3. A bicycle seat as set forth in claim 2 wherein the cushion insert includes a lower cushion and an upper cushion spaced from the lower cushion defining a cushion cavity therebetween coextensively defined between the upper and lower cushions, with a flexible fluid container mounted within the cushion cavity.

4. A bicycle seat as set forth in claim 3 wherein the fluid container includes a fluid container valve extending through an opening in the side wall of the seat.

5. A bicycle seat as set forth in claim 4 further including a pneumatic chamber overlying the fluid container, wherein the pneumatic chamber includes a pneumatic chamber valve extending through a further opening in the side wall, wherein the pneumatic chamber and the fluid container are selectively filled with a gas and a fluid respectively therewithin.

* * * * *